June 22, 1948.  J. N. PATTERSON  2,443,929

VALVE

Filed Dec. 12, 1945

Inventor:
James N. Patterson
by his Attorneys
Howson & Howson

Patented June 22, 1948

2,443,929

UNITED STATES PATENT OFFICE 2,443,929

VALVE

James N. Patterson, Pitman, N. J.

Application December 12, 1945, Serial No. 634,530

5 Claims. (Cl. 251—18)

This invention relates to shutter or gate valves of the quick-acting type adapted for use as boiler b'ow-off valves or for controlling the flow of liquid or gaseous fluid traveling in either direction through a pipe line in which the valve is installed.

Normally, valves of the type noted above are provided with a pair of axially aligned relatively spaced ports and a pair of similar axially aligned circular valve discs arranged to cover said ports respectively and to be swung as a unit, in a plane intermediate said ports, from an active position closing said ports simultaneously to an inactive position for opening said ports to permit straight-through flow of the fluid from the one port into the other of said ports.

Usually the valve casing is provided with a pair of smooth plain segmental surfaces in the same planes as and contiguous with the valve seats of the respective ports, at one side thereof, to slidably receive the valve discs when moved to their inactive position. The swinging of the valve discs from their active to their inactive positions and vice versa, frequently cuts grooves in the valve seats and the adjacent segmental slide surfaces.

Attempts have been made to correct this condition and to grind-in the valve seats by rotating the discs on the valve seats, and the adjacent slide surfaces, first in one direction and then in the opposite direction, each time the valve is opened and closed, but such oscillatory movement of the valve discs has failed in its purpose.

The object of the present invention is to provide a unique, simple, and efficient means for rotating the valve discs always in but one and the same direction, prior to opening the valve each time; or for turning the discs on the valve seats without effecting any opening of the valve whatsoever, whereby the valve seats and discs may be ground-in without dismantling the valve in any way whatsoever.

Figure 1:
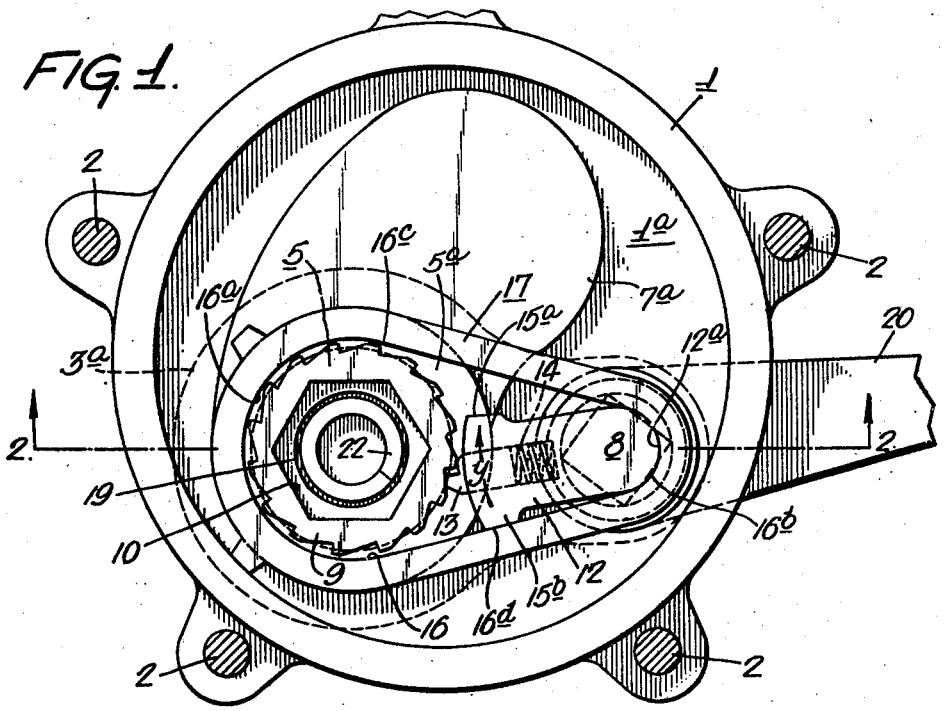
Figure 2:
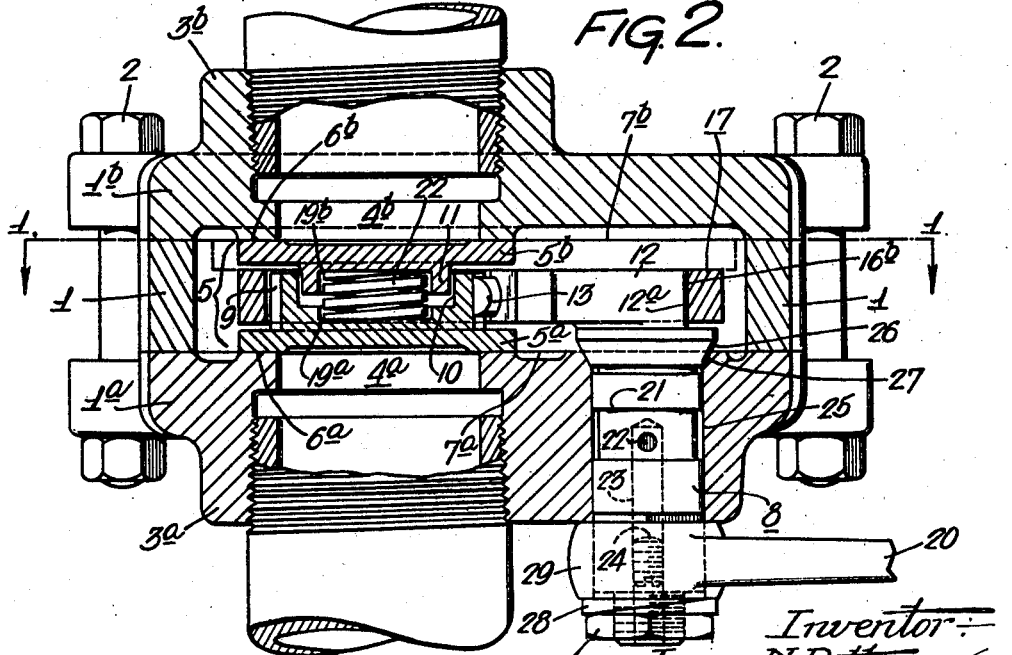

In the accompanying drawing:

Fig. 1 is a plan view of the valve with one section of the valve casing removed, as a section taken on the line 1—1, Fig. 2; and Fig. 2 is a sectional view as taken on the line 2—2, Fig. 1.

The valve comprises a three part casing including a central ring-like body member 1, a post-bearing body member 1a, and a blank body member 1b, all of which are aligned and held rigidly together as a unit by bolts 2, 2. The casing parts 1a and 1b are provided with aligned internally threaded pipe bosses 3a, 3b respectively and with axially aligned fluid ports 4a, 4b. These ports are normally closed by a valve disc unit or assembly 5, consisting of two circular discs 5a and 5b which bear respectively against valve seats 6a, 6b, concentric with the ports 4a, 4b respectively. The seats 6a, 6b are respectively provided with segmental flush extension pads having smooth slide surfaces 7a, 7b. These slide surfaces are formed concentric to the axis of an operating post 8, which is rotatably mounted in the post body 1a.

Between the discs 5a, 5b is a ratchet wheel 9 which is integral with the disc 5a in the present instance. The ratchet wheel 9 is provided with a hexagonally shaped recess 10 for reception of a similarly externally shaped boss 11, formed on the back of the disc 5b, so that the ratchet wheel 9 and discs 5a, 5b will rotate as a unit.

The ratchet wheel 9 and lug 11 are circularly recessed at 19a and 19b respectively for reception of a compression spring 22 by which the valve discs 5a and 5b are firmly pressed in opposite directions against the valve seats 6a, 6b and their contiguous slide surfaces 7a and 7b.

On the inner end of the post 8 is a lever 12 which carries a slidable pawl 13 at its outer end for cooperation with the teeth of the ratchet wheel 9, under pressure of a spring 14 housed in the lever 12. The lever 12 also has a pair of abutment lugs 15a, 15b on the opposite sides respectively thereof.

The lever 12, pawl 13, and ratchet wheel 9 are housed in a cavity 16 formed in carrier lever 17. The cavity 16 includes a larger radius circular end 16a which functions as a bearing for the ratchet wheel 9 to revolve in, and a smaller circular end 16b forming a bearing around the heel 12a of the lever 12 on the post 8.

The post 8, outside the casing 1—1a—1b is provided with an operating arm 20. With the parts in the positions shown in Fig. 2, the first movement of the arm 20 in the direction of the arrow y swings the lever 12 about the axis of the post 8 and the pawl 13 thereby rotates the disc assembly 5 a partial revolution, through the ratchet wheel 9, until the abutment lug 15a on the preliminary operating lever strikes the wall 16c of the recess 16 in the carrier or main operating lever 17, whereupon, further continued swinging of the arm 20 swings the preliminary lever 12 and the main lever 17 about the axis of the post 8 and moves the discs 5a, 5b out of line with the ports 4a, 4b and between the segmental surfaces 7a, 7b, to the extent the valve 5 is to be opened.

Reverse swinging of the arm 20 causes the lever 12 to be correspondingly swung backward first to slip the pawl 13 reversely over the teeth of the ratchet wheel 9 until the lug 15b of lever 12 strikes the wall 16d of the recess 16 in the main lever 17, whereupon the main lever 17 is swung backwardly with the valve assembly 5 which is thereby moved into the closed position of Fig. 2 ready for a subsequent opening of the valve.

During the step-by-step single directional rotation of the valve assembly 5, each time the valve is opened, the valve discs 5a and 5b are ground-in against the valve seats 6a, 6b, before the valve assembly 5 is moved out of line with the ports 4a, 4b. This grinding-in may be continued without opening the ports 4a, 4b by merely rocking the arm 20 and lever 12 within the recess 16 of the main lever 17 without rocking the lever 17.

The post 8 is circumferentially grooved at 21, transversely bored at 22, and axially bored and threaded at 23 for reception of a screw 24 which may or may not project outside the valve structure. A soft displaceable packing material (not shown) like putty, rubber, or other plastic, or a suitable heavy grease, is placed in the bore 23 and the screw 24 is then inserted to displace the packing material through the transverse bore 22 into the packing groove 21 and into sealing contact with the circular wall 25 of the bearing for the post 8.

In addition, the post 8 is provided with an annular axially tapered or beveled flange 26 which preferably has a ground-in fit with a correspondingly beveled seat 27 formed in the casing member 1a, whereby fluid leakage around the operating post 8 is effectively prevented. Firm sealing contact is maintained between the beveled surfaces 26 and 27 by a spring 28 mounted on the post 28 between the hub 29 of the operating arm 20 and a nut 30 threaded onto the outer end of the post 8.

I claim:

1. A valve structure comprising a casing having a pair of oppositely disposed ports, a pair of valve seats respectively encircling said ports in relatively spaced parallel planes, a valve unit intermediate said planes and including a pair of discs bearing flatly against said seats respectively to close said ports, ratchet mechanism including a pawl-carrying lever for rotating said discs on said seats in one direction solely, means including a lever coaxial with said pawl-carrying lever for moving said unit laterally to unseat said discs, and means affording lost motion between said levers for selectively rotating and unseating said discs relative to said seats.

2. A valve structure comprising a casing having a pair of oppositely disposed ports, a pair of valve seats respectively encircling said ports in relatively spaced parallel planes, a valve unit intermediate said planes and including a pair of discs bearing flatly against said seats respectively to close said ports, ratchet mechanism for rotating said discs on said seats in one direction solely and including a ratchet wheel intermediate and connected to said discs, a pawl engageable with said ratchet wheel, a lever carrying said pawl, an operating post carrying said lever, and an arm on said post outside said casing for rocking said lever to rotate said ratchet wheel intermittently.

3. A valve structure comprising a casing having a pair of oppositely disposed ports, a pair of valve seats respectively encircling said ports in relatively spaced parallel planes, a valve unit intermediate said planes and including a pair of discs bearing flatly against said seats respectively to close said ports, ratchet mechanism for rotating said discs on said seats in one direction solely and including a ratchet wheel intermediate and connected to said discs, a pawl engageable with said ratchet wheel, a lever carrying said pawl, an operating post carrying said lever, an arm on said post outside said casing for rocking said lever to rotate said ratchet wheel intermittently, a hollow lever embracing said ratchet wheel said pawl-carrying lever and said post, and a lug on said pawl-carrying lever engageable with an internal wall of said hollow lever for actuating said hollow lever and valve unit to unseat said discs subsequent to rotation of said discs on their respective seats by initial rocking of said pawl-carrying lever within and relative to said hollow lever.

4. A valve structure comprising a casing having a pair of oppositely disposed ports, a pair of valve seats respectively encircling said ports in relatively spaced parallel planes, a valve unit intermediate said planes and including a pair of discs bearing flatly against said seats respectively to close said ports, means for rotating said discs on said seats and for moving said discs laterally off said seats comprising an operating post rotatably mounted in and projecting outside said casing, an actuating arm secured to said post outside said casing, a pair of levers carried by said post inside said casing, means securing one of said levers to said post, means affording relative lost motion between said levers about the axis of said post for selectively rotating and unseating said discs, a pawl carried by said one lever, means rotatably supporting said valve unit in the second of said levers, a ratchet wheel carried by said valve unit and engageable by said pawl whereby initial rotation of said one lever will effect rotation of said discs on said seats in one direction and whereby continued rotation of said one lever will unseat said discs and open said ports.

5. An operating structure for a valve unit including a pair of discs adapted to bear flatly against a pair of oppositely disposed parallel relatively spaced seats, mechanism for rotating said discs on said seats in one direction solely and for unseating said discs including an operating post, a pair of levers relatively movable about the axis of said post with one of said levers fixed to said post and the other lever loose on said post, a ratchet wheel intermediate and connected to said discs, a pawl carried by said fixed lever and engageable with said ratchet wheel, means rotatably supporting said unit in said loose lever, an arm on said post for rocking said fixed lever to rotate said ratchet wheel intermittently, and lost motion means intermediate said levers to afford rotation of said discs on said seats or moving said discs laterally off said seats.

JAMES N. PATTERSON.

REFERENCES CITED

The following references are of record in the file of this patent:

UNITED STATES PATENTS

| Number | Name | Date |
| --- | --- | --- |
| 1,091,918 | Eynon | Mar. 31, 1914 |
| 1,826,941 | LaMont | Oct. 13, 1931 |

FOREIGN PATENTS

| Number | Country | Date |
| --- | --- | --- |
| 22,909 | Great Britain | 1905 |